J. J. FOLEY.
SECTIONAL RIM.
APPLICATION FILED NOV. 6, 1916.
1,238,996.
Patented Sept. 4, 1917.
2 SHEETS—SHEET 1.
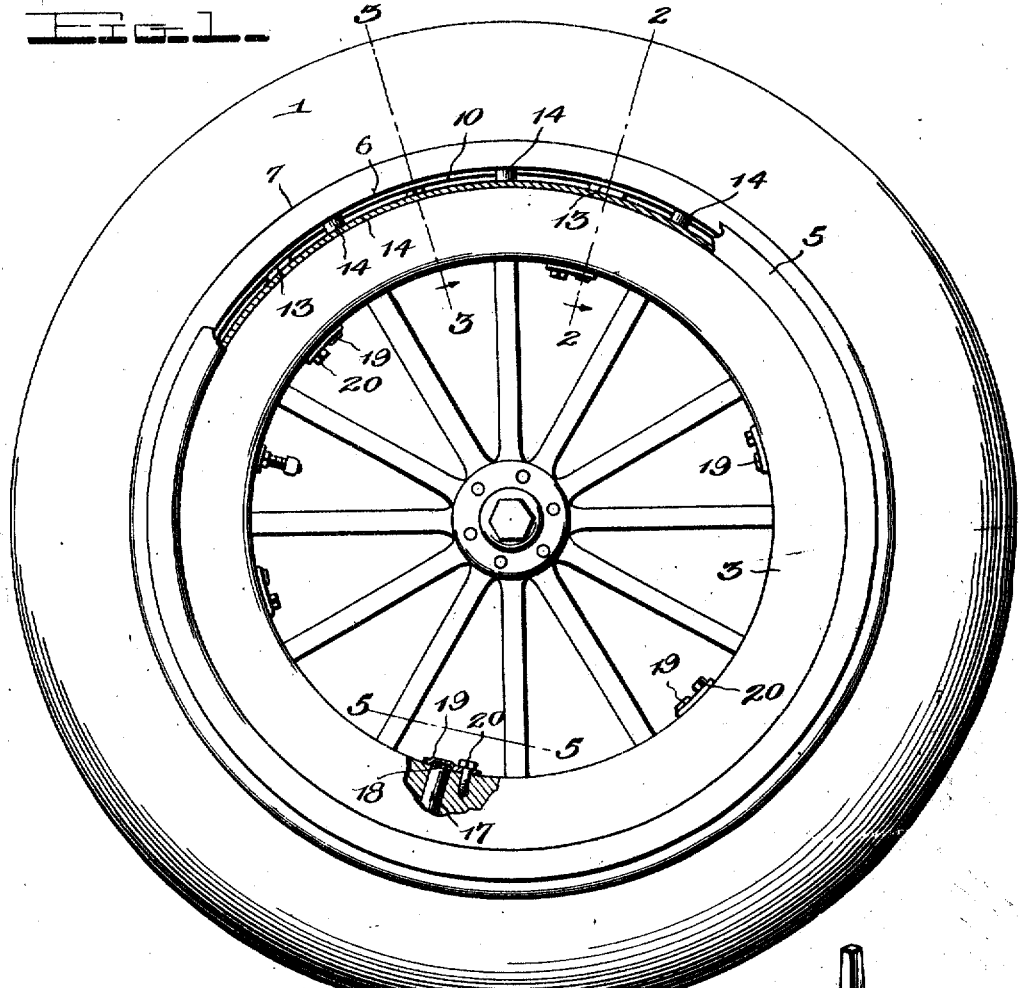
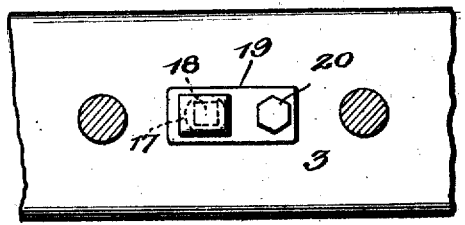
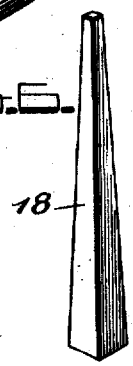
Witness
Chas. L. Greebauer
Inventor
John J. Foley,
By G. B. McBath
Attorney

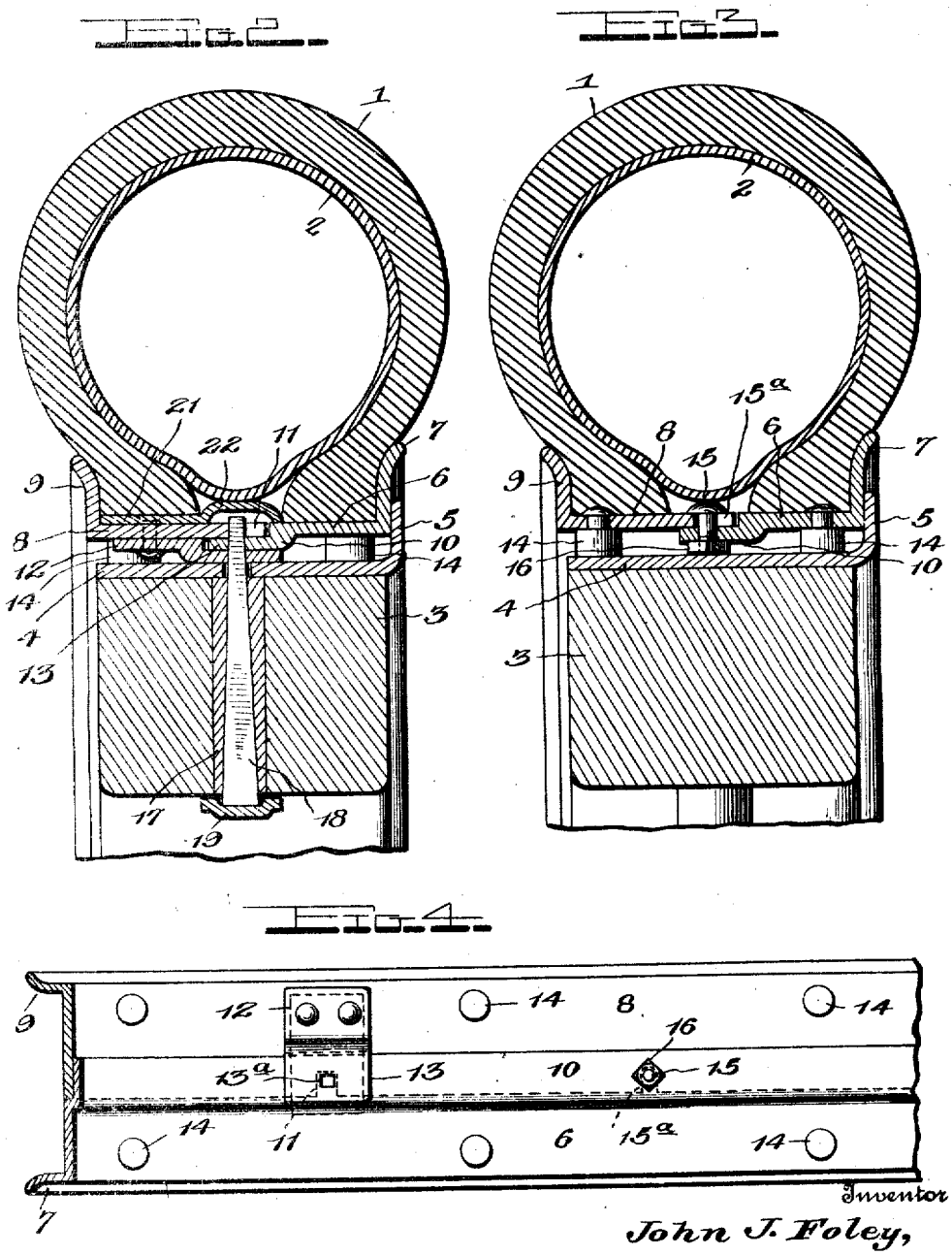

UNITED STATES PATENT OFFICE.

JOHN JOSEPH FOLEY, OF SAN FRANCISCO, CALIFORNIA.

SECTIONAL RIM.

1,238,996.   Specification of Letters Patent.   Patented Sept. 4, 1917.

Application filed November 6, 1916. Serial No. 129,719.

*To all whom it may concern:*

Be it known that I, JOHN J. FOLEY, a citizen of the United States, residing at San Francisco, in the county of San Francisco and State of California, have invented certain new and useful Improvements in Sectional Rims, of which the following is a specification.

This invention relates to a sectional, demountable rim for automobiles, and the object of the invention is to provide a rim of this type which can be quickly applied and secured to the wheel, and which will have the sections locked together before being placed on the wheel.

The invention also includes novel features of construction which will be hereinafter described, pointed out in the claims, and which are shown in the drawings, as follows:—

Figure 1 is a side elevation of the wheel partly in section.

Fig. 2 is a section on the line 2—2 of Fig. 1.

Fig. 3 is a section on the line 3—3 of Fig. 1.

Fig. 4 is a plan view of a portion of the inner face of the sectional rim, the sections being secured together.

Fig. 5 is a section on the line 5—5 of Fig. 1.

Fig. 6 is a perspective view of a locking pin.

In the drawings 1 is the outer casing and 2 the inner tube of any desired make of pneumatic tire.

The felly 3 is provided with a metal rim 4 having a retaining flange 5 on one side.

My divided rim is formed in two sections, the section 6 having a curved flange 7 along its outer edge, and the section 8 having a similar flange 9. When the two sections 6 and 8 are secured together and placed on the wheel, one of these flanges, in the drawings the flange 7, will engage the flange 5 of the felly rim 4.

The sections 6 and 8 are designed to overlap and the section 6 has its inner marginal portion offset, as at 10, the inner marginal portion of the section 8 resting on said offset portion. The marginal overlapping portion of the section 8 is notched at suitable intervals as at 11.

To make a secure joint and aid in retaining the sections in proper relative position plates 12 are bolted or riveted to the inner face of the section 8 and these plates have offset portions 13 which lap beneath or over the offset 10 of the section 6, so that said offset is held between the section 6 and the inner portion of the plates 12. The offsets 13 are provided with opening 13ª which, when the plates are in position, register with the notches 11.

In order that the section rim will have no rocking movement on the wheel I provide the sections 6 and 8 with lugs 14 which bear on the wheel, and respectively on opposite sides of the offset portions.

The sections 6 and 8 are secured together when off as well as when on the wheel by bolts 15 and nuts 16 which bolts pass through notches 15ª in the section 8 and through suitable openings in the offset portion 10 of the section 6, the bolts and nuts resting on the rim 4, as in Fig. 3.

Through the felly I pass sleeves 17, preferably six in number, and this sleeve is preferably a casting having a tapering bore longitudinally through it, its exterior shape is not material, nor is it material whether the bore is square or oblong in cross section. Fitting in the bore and adapted to wedge therein is a locking pin 18 also tapered and of proper cross section to accommodate the bore of the sleeve 17. In the drawings I have shown said pin as square in cross section, though it may have any other desired shape. But it can be more quickly fitted in place when made square, especially if the work has to be done after dark and with but little light.

The locking pin is longer than the sleeve and passes through suitable openings including the opening 13ª and notch 11, passing through both offset portions 10 and 13 and through the section 8.

It is retained in place by a plate or cap 19 secured to the inner face of the felly by a screw 20. There are of course as many locking pins and caps as sleeves.

To prevent damage to the inner tube when inflated by the inner ends of the locking pins I secure a plate 21 to the sections 8 over, or opposite, each plate 12, each plate 21 having an offset portion 22 adapted to cover the inner end of a locking pin and to afford a smooth support for the inner tube. The same rivets that secure the plates 12 to the section 8 are also used to secure the plates 21.

It will be obvious from the above that I have a sectional rim to which the outer tire can be readily secured, and the two sections then locked together by the bolts 15.

It can then be quickly placed on a wheel and locked by inserting the pins 18, and tightening the screw 20 of the retaining plate 19 for each pin. A wrench for these screws being the only tool needed, or in an emergency they could be tightened by the fingers, there being practically no strain on the caps 19 the pin wedging more or less snugly into the sleeve 17.

What I claim is:—

1. In a sectional rim, sections having outer tire retaining flanges, one of said sections having its inner marginal portion offset, and the other section overlapping the offset portion, and plates secured to the last mentioned section and also being offset and overlapping the offset portion of the first mentioned section.

2. In a divided rim, a flanged section having its inner marginal portion offset, a second flanged section adapted to overlap the offset of the first section, plates with offset portions carried by the second section, the plates being offset to overlap the offset of the first section, means for securing the sections in relative position with respect to each other, and lugs carried by the sections, respectively, and adapted to bear on a wheel rim.

3. In a divided rim, a flanged section having an offset inner marginal portion, a flanged section overlapping said offset portion, plates carried by the inner face of the last mentioned section and overlapping the offset portion, said portion being held between the second mentioned section and said plates, and bolts passing through the overlapping sections and securing them together.

In testimony whereof I affix my signature.

JOHN JOSEPH FOLEY.